June 13, 1950. K. G. CUSTER 2,511,330

BELT

Filed Sept. 23, 1949 2 Sheets-Sheet 1

INVENTOR.
Kenneth G. Custer
BY
Martin E. Anderson
ATTORNEY

June 13, 1950 K. G. CUSTER 2,511,330
BELT
Filed Sept. 23, 1949 2 Sheets-Sheet 2

INVENTOR.
KENNETH G. CUSTER
BY
ATTORNEYS

Patented June 13, 1950

2,511,330

UNITED STATES PATENT OFFICE 2,511,330

BELT

Kenneth G. Custer, Denver, Colo., assignor to The Gates Rubber Company, Denver, Colo., a corporation of Colorado Application September 23, 1949, Serial No. 117,359

2 Claims. (Cl. 74—233)

This invention relates to improvements in belts of the side driving V-type, and is a continuation-in-part of application Serial No. 36,939, filed July 3, 1948, which in turn, is a continuation-in-part of application Serial No. 507,214, filed October 21, 1943, both of said applications now being abandoned.

Side driving V-type belts are extensively employed for the transmission of power and are, as a rule, provided with a cover of bias cut rubberized woven fabric.

Due to the thickness of V-type belts, which strictly speaking are truncated V-shape but are commonly referred to as V-belts, there is a considerable compression of the material on the inside of the neutral axis and corresponding extension of the material on the outside of the neutral axis as the belt passes around the pulleys. If we consider a belt transmitting power between two pulleys of equal diameter, the arc of contact will be 180 degrees and the total difference in length between the inside and the outside surfaces of a belt having a thickness $t$ will be $2\pi t$ inches. If the belt is one-half inch thick, the difference in length between the inside and the outside surfaces for each arc of 180 degrees is 1.57 inches. The difference in length is independent of the diameter of the pulley and since such belts are usually used in connection with transmissions having at least one small pulley, the compression and elongation per inch of contact arc becomes considerable.

The fabric covering with which such belts are provided is woven from threads of twisted fibers, such as cotton, nylon or rayon. When such threads are longitudinally compressed, the strands and fibers tend to separate and to expand, whereupon the fibers separate and become exposed to the action of dirt, dust and moisture. Since there is always a space between the bottom of the pulley groove and the inside surface of the belt, there is also present a strong centrifugal force that tends to urge dust, moisture and particles into engagement with the belt, and into fibers of the threads during the time that these are separated by the compression. The action of such foreign particles is to cause the threads to harden and to weaken with the result that they break, permitting deep cracks to form in the inside surface of the belt transversely thereof.

When woven fabric is used for an outer covering such fabric is, as a rule, "rubbererized." This "rubberizing" does not serve to protect the fiber against the deleterious action mentioned as it merely forms an exceedingly thin coating over the outside surfaces of the threads to effect adhesion with the belt body; this covering soon breaks and permits the penetration referred to, thereby weakening the threads which soon thereafter break.

It is the object of this invention to produce a belt having means for protecting the woven inner fabric surface against breakage due to the destructive action above pointed out.

This invention, briefly described, consists in applying to the inside surface, only, of V-type belts, having a covering of rubberized fabric, a separate or additional strip of rubber or rubber-like material of certain thickness, hereinafter fully specified, to form a seal that prevents the objectionable foreign material from penetrating the threads. The seal must have sufficient elasticity to prevent it from cracking as a result of the repeated compressions and extensions to which it is subjected.

In order to more clearly describe this invention, reference will now be had to the accompanying drawing in which a belt constructed in accordance with this invention has been illustrated, and in which a belt of the usual construction has also been shown.

Figure 1:
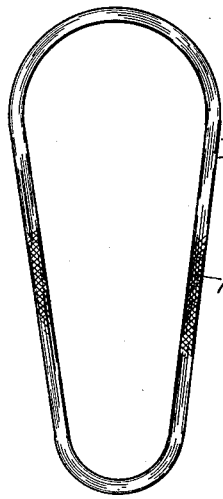
Figure 1 is a side view of an ordinary V-type transmission belt.

In the drawing, reference numeral 10 designates a side-driving V-type belt having a bias cut rubberized woven fabric covering that has been designated by reference numeral 11. The belt is constructed in the usual manner and is provided with a body portion 12, which is usually made from natural rubber, or which may be made from any rubberlike material such as some of the "synthetic rubbers" now being manufactured, it being understood that "rubber" as herein employed is to include both natural and synthetic rubber. Extending longitudinally through the body are a number of tension elements 13 which may be fiber cords or metal wires. The belt is enclosed in the bias cut rubberized fabric covering 11. After the covering has been put in place, the inside surface is covered with a seal strip 14 of rubber or rubberlike material. This material is vulcanized to the fabric, the thin friction or skim coat of the rubberized fabric serving to attach the seal strip to the fabric so as to form with the fabric covering and the belt a substantially unitary body. The protective strip is vulcanized to the rubberized fabric covering and is in addition to the friction coat of the rubberized fabric.

It has been found that when a belt is provided on its inside surface with a protective seal strip like that above described, its life will be increased more than two hundred per cent above that of a belt of otherwise similar construction when operating under same operating conditions in the presence of dust and other foreign matter.

Figure 2:
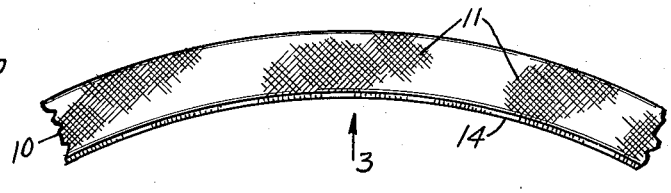
Figure 2 is a side elevation of a short section of such a belt showing the protective layer applied to the inside surface thereof.
Figure 4:
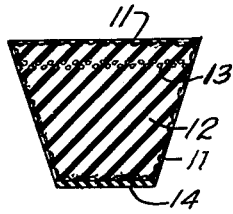
Figure 4 is a section taken on line 4—4, Figure 3.
Figure 3:
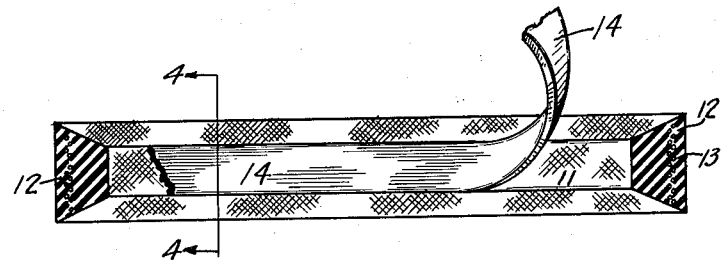
Figure 3 is a view looking in the direction of arrow 3, Figure 2, the left portion thereof showing the appearance of the inner surface after the belt has been subjected to a destructive test, and the right portion showing that the protective layer is an additional element from the ordinary belt, this being shown in removed relation only for the purpose of illustrating its distinct characteristic.
Figure 5:
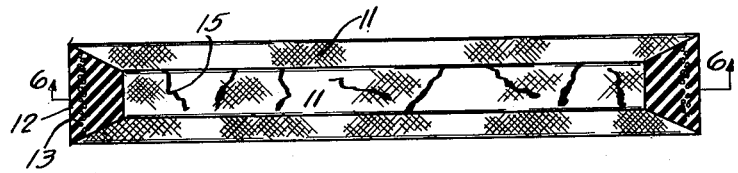
Figure 5 is a view similar to that shown in Figure 3 and shows the appearance of the inside surface of a belt constructed in the ordinary way without the protective inner seal shown in Figure 2.
Figure 6:
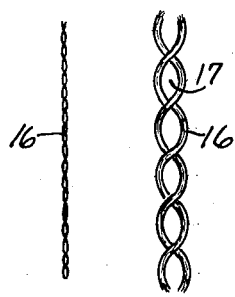
Figure 6 is a section taken on line 6—6, Figure 5.

In the drawing, Figures 5 and 6 show the appearance of a belt of identical construction and of the same materials and composition as that used in the belt illustrated in Figures 2 and 3 after the same length of use under the same conditions. The belt shown in Figures 5 and 6 did not have the protective strip on the inside and as a result the fabric covering the inside of the belt cracked forming a large number of cracks 15, some of which extended transversely and some of which extended in other directions. These cracks will often extend through the fabric and into the body of the belt.

The belt above described has been subjected to tests in comparison with belts of otherwise identical construction, the tests taking place under the same operative conditions. Tests have conclusively shown that a belt to which a seal strip of approximately twenty-five thousandths of an inch in thickness is vulcanized, has a useful life of more than twice that of a similar belt having no seal strip.

In addition to laboratory tests by the University of Colorado, and others, these belts have been in experimental use for some time and their operation and length of life compared with otherwise identical belts. The results of these tests have always shown a marked increase in the useful life of sealed belts constructed in accordance with this invention.

Figure 7:
Figure 7 is a view in which "A" shows an ordinary twisted cotton thread and "B" shows a short section of the thread under longitudinal compression.

In the above description, what is believed to be the correct explanation of this phenomenon has been given, and in Figure 7 an attempt has been made to show a cotton thread 16 both in its normal and in its compressed state. In "A" the thread is supposed to be in its normal state, while in "B" it has been compressed axially causing the fibers and the strands from which the thread is made to bulge outwardly producing openings 17. In actuality, the fibers of the separate strands also separate slightly and thus leave the material of which the thread is constructed exposed to the deleterious action of the material above mentioned. Whether this is the true explanation of the phenomenon or not, the fact remains that by vulcanizing to the inside surface of such a belt a protective strip 14, the production of cracks and the destructive effect of the same are greatly minimized. By this simple expedient the belts are given a greatly increased life of usefulness.

Since the fabric covering is, as a rule, bias cut and since the compression of the inner surface of the belt is in a longitudinal direction, the threads are subjected to a degree of longitudinal compression which is a function of their angular relation to the belt axis.

In order that certain terminology previously employed may be clearly understood, and this invention distinguished from the prior art, certain conventional belt construction materials and the terminology of the art in connection therewith will now be described in detail.

In the manufacture of V belts it is common practice to provide a woven bias cut fabric cover around the belt core, "bias cut" meaning that the crossing threads of the fabric are disposed angularly to the longitudinal axis of the belt. This material is usually "rubberized" with a "friction" coat. In the making of fabric of this type a wide sheet of fabric is passed between a pair of rolls, one roll being the "calender" roll which applies rubber to the fabric. This roll rotates at a higher peripheral velocity than its cooperating roll and as a result rubber is mechanically worked into the interstices between the fabric fibers.

In some cases it is desired to place what is known as a "skim" coat of rubber on the fabric which has previously been given a fraction coat, on one or both sides thereof. In applying the "skim" coat a previously "frictioned" fabric is passed between rolls as before described but the calender roll rotates at the same peripheral speed as its cooperating roll and lays on a thin coating of rubber which is in addition to the friction coat. This skim coat may vary somewhat in thickness but is usually less than ten thousandths of an inch in its uncured state and several thousandths of an inch less after curing because heat and pressure during curing causes the frictioned and skim coats to be forced into and more completely fill the interstices of the fabric. These treated fabrics are conventional and well known materials of the art and are those which are referred to by the terminology employed herein, it being understood that the term "rubberized" fabric is generic to fabrics which have either a "friction" or "skim coat."

It is common practice in the art to provide belts having covers with either a friction coat or a skim coat, and the belt illustrated in Figures 5 and 6 is a belt of this type. The present invention is to be clearly distinguished from belts of this type since this invention employs an additional strip of rubber to the cover, that is, if a frictioned material is employed, then the seal strip 14 is in addition to the frictioned coat and of a thickness hereinafter specified, and if a skim coat material is employed, the seal strip is in addition to the combined thickness of the frictioned and skim coats. In other words, regardless of whether the material is a frictioned or skim coat material the seal strip is an additional element not present in either of the conventional materials of this art.

This invention in its broader aspect contemplates the application of the seal strip to a "rubberized" fabric, that is, one which has either a friction coat or a skim coat in addition to the friction coat. A frictioned coat is usually to be preferred, however, for the reason that frictioned side walls on the belt provide a satisfactory wearing surface and if a skim coat is present on such side walls it soons wears away and therefore requires readjustment of the pulley center distances. It should now become readily apparent that if a conventional belt has a frictioned cover, the inner or narrow surface thereof will also be frictioned material, and what perceptible thickness of rubber is present on the fabric will be the same thickness on all sides of the belt. Similarly, with a skim coat. In either case there would not be a strip of rubber on the inner surface which has a thickness in excess of any rubber coating on the converging driving sides of the belt, as in the present invention.

It has been found that the thickness of the seal strip falls within certain critical limits which will now be described in detail. If the seal strip is too thin it does not offer sufficient protection to increase the useful life of the belt to any great extent. In the tests referred to the thickness was approximately twenty-five thousandths of an inch when the strip was applied to the belt in uncured state and thins several thousands during curing. These belts have been found to have a life of two hundred to three hundred per cent of the life of the identical belt not provided with the seal strip. It may be said therefore, in general, that the life of the belt, as a function of seal strip thickness increases to two to three times between zero seal strip thickness and a thickness, in the finished state of the belt, of about twenty thousandths of an inch.

Figure 8:
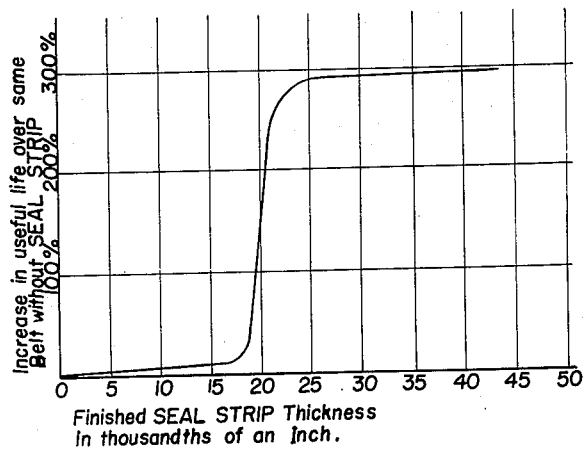
Figure 8 illustrates the relationship between seal strip thickness and useful belt life.

The effect of increase in life of the belt by increase in seal thickness beyond about twenty-five thousandths of an inch is not fully known and it would take probably several years to fully compile data in this upper range. It is believed, however, that the increase in life would not increase at nearly as rapid a rate as between zero thickness and about twenty-five thousandths of an inch. The chart shown in Figure 8 is believed to show this general relationship. It will be observed that between zero seal strip thickness and about twenty-five thousandths of an inch thickness belt life has increased between two and three hundred per cent over the identical belt not provided with the seal strip. Beyond this thickness it is believed that the curve would flatten somewhat as shown, and the increase in life would increase much more slowly. The upper limit of thickness is therefore believed to be less critical than the lower limit insofar as it concerns the protective value of the seal strip, but is critical from a production point of view when the belt is constructed in accordance with the method of making the belt to now be described.

Figure 9:
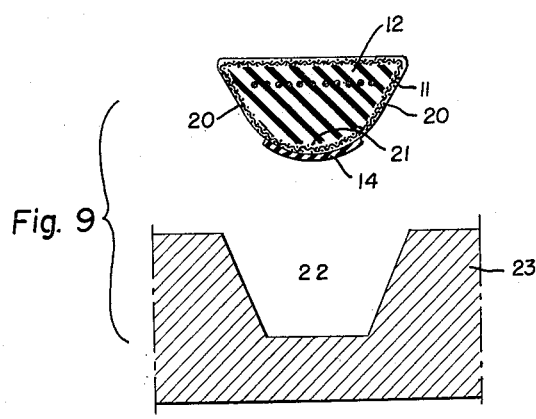
Figure 9 is a cross section of a belt, prior to curing, with the seal strip applied thereto.
Figure 10:
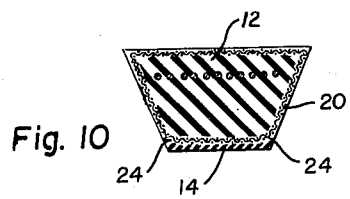
Figures 10 to 14 are cross sections illustrating actual belts cured with various thicknesses of seal strip thereon in the manner shown in Figure 9.

Referring to Figure 9, a belt 10 is shown in its uncured stage of manufacture, the fabric cover 11 having been applied to the body portion 12 of the belt and the rubber seal strip 14 applied to its inner surface, the belt now being in its "built up" stage ready for vulcanizing. It will be observed that the side walls at 20 and the inner surface at 21 are somewhat convex. Assuming now that the seal strip 14 is twenty thousandths of an inch thick and the belt is forced into cavity 22 of mold 23 and cured, the belt will have the cross sectional characteristics shown in Figure 10 after the cure is completed. It will be observed that the cover on the side walls remains exposed on the entire width and the rubber seal strip is confined on the entire width and the rubber seal strip is confined to the inner face of the belt, with only a very slight flow of rubber 24 into the corners at the juncture of the sides and inner surface. It will be observed, also, that the seal strip is uniform in thickness across the inner surface of the belt. These are the optimum conditions desired since the entire width of the side walls are provided with the exposed fabric, which serves as the wearing surface, and as the belt wears in use, wear will occur evenly on the entire width of the side wall covers.

Figure 11:
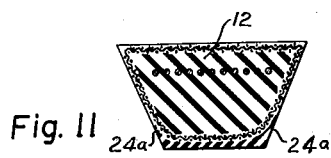

In Figure 11 is shown the effect of curing the same belt with a seal strip of thirty thousandths of an inch in thickness. It will be observed that the cover at the side walls and inner surface remains substantially straight but the rubber of the seal strip has flowed along the side walls as shown at 24a and hence the entire surface of the side wall cover is no longer exposed. This is a departure from optimum conditions because the fabric of the side walls is no longer parallel to the pulley surface and the upper portions of the fabric will wear more than the lower portions thereof.

Figure 12:
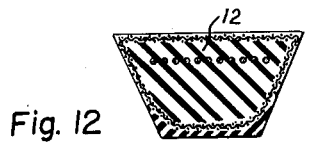

In Figure 12 is shown the effect of curing the same belt with a seal strip of forty thousandths of an inch in thickness. It will be observed that there is little change over the belt of Figure 11 except for the increase in seal strip thickness.

Figure 13:
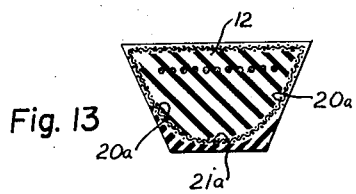

In Figure 13 is shown the effect of curing the same belt with a seal strip of fifty thousandths of an inch in thickness. The cover at the side walls and at the bottom are now noticeably convex as shown at 20a and 21a, respectively, which would concentrate wear on the side walls at the outer or top edges.

Figure 14:
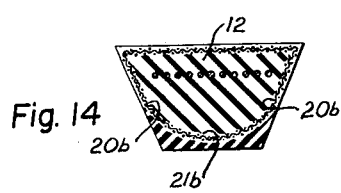

In Figure 14 is shown the effect of curing the same belt with a seal strip of sixty thousandths of an inch in thickness. The convexity of the side walls and inner surface as shown at 20b and 21b, respectively, has increased somewhat over that of Figure 13, and the shape of the body of the belt, inwardly of the outer surface of the cover, is substantially the same as in its uncured stage, that is, as shown in Figure 9. Belts with seal strips of greater thickness than sixty thousandths of an inch have been made but they have substantially the same appearance as the belt shown in Figure 14, except of course, for increase in thickness of the strip at the inner surface.

The upper critical limit of the strip thickness seems to lie somewhere between forty and fifty thousandths of an inch when a belt is built up and cured in the manner shown in Figure 9, this for the practical reason that undesirable flow of the strip up and along the side walls occurs with greater seal strip thickness.

It is within the purview of this invention to provide a seal strip of greater thickness than the upper critical specified but it would require a somewhat different method of construction which will now be described. One mode of producing a belt like that shown in Figure 10, but with increased strip thickness, would entail a semi or full cure of the belt without the seal strip thereon to thus form it to the correct shape with the fabric side walls exposed the full width of the belt. The seal strip would then be applied and in a second cure vulcanized to the inner surface, the mold employed in the second cure having a cavity slightly deeper than the cavity of the mold employed in the first cure. In this manner, the belt would substantially fit the mold during the second cure and since no reforming of the belt shape would occur, the strip could be confined only to the inner surface, eliminating the flow of rubber up and along the driving sides of the belt. This method, of course, has the disadvantage that two cures are necessary, rather than one.

It is apparent, also, that the belt may be made with a seal strip in excess of the upper limit previously specified, in a single cure, if the "built up" belt is of a shape, prior to curing, of substantially the shape of the mold so that no objectionable flow of the seal strip along the side walls of the belt will occur when the belt is subjected to heat and pressure during the curing operation in the mold. There is, of course, no point in adding an excessive amount of rubber in the seal strip since it detracts from the thickness of the belt core and would serve no useful purpose if the thickness were greater than the optimum thickness to produce substantially maximum useful life. Otherwise stated, and as illustrated in Figure 8, the life of the belt would increase rapidly with increase in belt thickness up to a certain critical thickness and then increase less rapidly for further increase in thickness. A point on such curve where desired increase in life is attained, and where further increase in thickness would begin to give diminishing returns from other considerations, such as undesired detraction of belt core thickness, or presence of excessive rubber on the side walls of the belt which would be subjected to shearing action and consequent wear with undesirable change of belt shape, would represent the maximum practical thickness of the seal strip regardless of the particular method employed in making the belt. In the broadest aspect of the invention, such thickness is contemplated within the purview thereof.

What is claimed as new is:

1. A belt of the side driving truncated V-type having a body composed of rubber-like material with longitudinally extending tension members therein and a rubberized woven fabric cover disposed about the belt, the inner surface of the cover between the driving sides of the belt having vulcanized thereto a strip of rubber of a width substantially the width of the inner surface of the cover, and of a thickness between approximately twenty and approximately fifty thousandths of an inch, forming a resilient seal protecting the inner surface of the cover against the entry of foreign matter.

2. A belt in accordance with claim 1 wherein the cover is bias cut frictioned fabric.

KENNETH G. CUSTER.

No references cited.